Jan. 23, 1968   H. A. WALL   3,364,730
CONSISTENCY MEASURING APPARATUS
Filed March 19, 1965   2 Sheets-Sheet 2
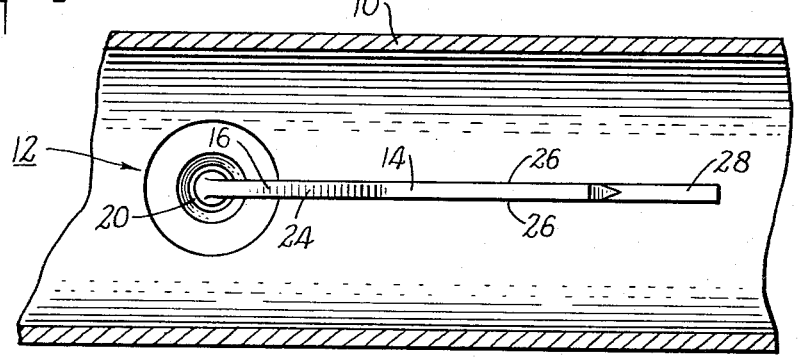
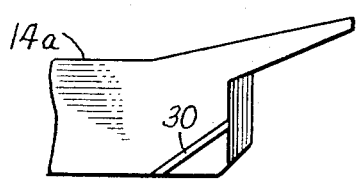 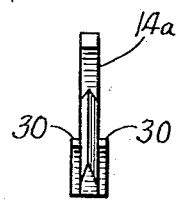
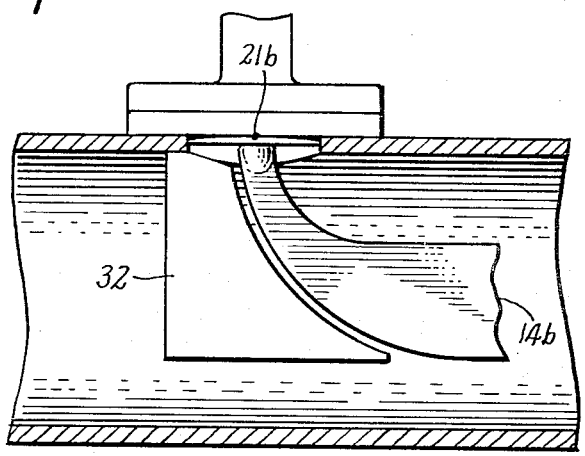
INVENTOR
Hugh Ambrose Wall
BY
Curtis Morris + Safford
ATTORNEYS

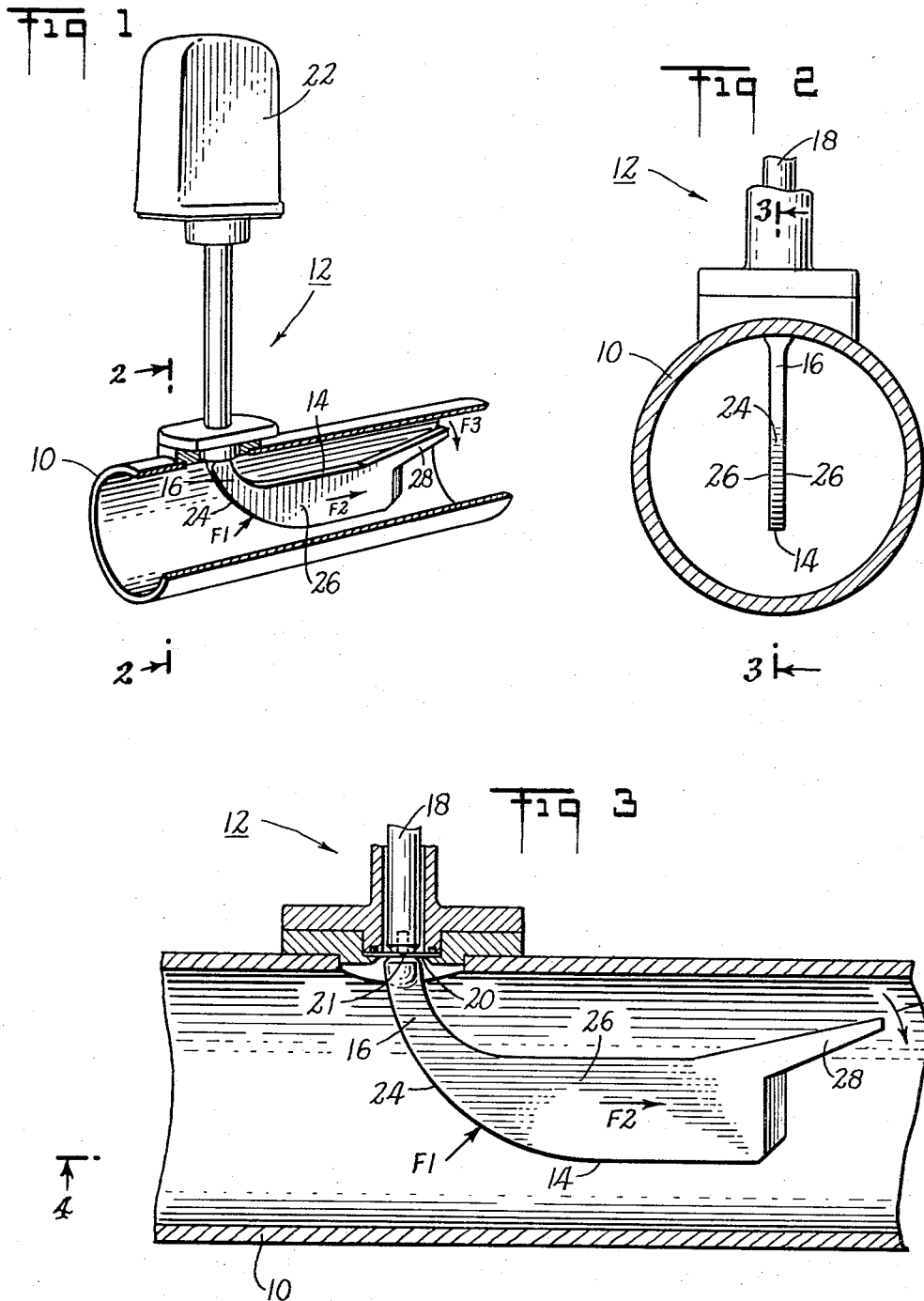

United States Patent Office 3,364,730
Patented Jan. 23, 1968

3,364,730
CONSISTENCY MEASURING APPARATUS
Hugh Ambrose Wall, Merstham, Surrey, England, assignor to The Foxboro Company, Foxboro, Mass.
Filed Mar. 19, 1965, Ser. No. 441,181
Claims priority, application Great Britain, Apr. 3, 1964, 13,884/64
18 Claims. (Cl. 73—59)

ABSTRACT OF THE DISCLOSURE

An instrument for measuring the consistency of flowing liquid-solid materials and comprising a scimitar-shaped blade pivotally supported in the flowing stream with its long dimension parallel to the stream movement, the pivot support axis being so arranged that drag forces created by the material sliding past the blade produce a torque around the pivot axis, there being provided a measuring device coupled to the pivot support to produce an output signal corresponding to the magnitude of torque induced by the flowing material.

---

The present invention relates to apparatus for measuring the consistency of solid-liquid mixtures, i.e., flowing mediums having solids in suspension. More particularly, this invention relates to techniques for measuring the consistency of non-Newtonian mixtures, and especially paper stock.

For purposes of this disclosure, consistency will be defined as the ratio of the weight of the solids to the total weight of the solids and liquid, for a given volume of the flowing medium. In paper stock, consistency is considered to be the percentage of fibers in the water.

It is important to the operation of certain industrial processes to be able to sense small variations in the consistency of a flowing liquid and to produce a corresponding output signal for transmission to suitable recording or control apparatus. Various devices have of course been proposed from time to time for this purpose. Some of the early devices were responsive essentially to the viscosity of the liquid, and thus were not well suited for use with non-Newtonian liquids, that is, liquids wherein the shear rate and stress relation is non-linear, as in paper stock slurries.

Devices also have been proposed for making consistency measurements based on characteristics other than viscosity. For example, there are instruments designed to respond to shear forces apparently created by deforming the stock stream, and comprising a plurality of finger-like projections extending in the flow stream.

Experience has shown that none of the instruments available heretofore has been fully satisfactory. In large part, this is because the measurement signals produced by prior instruments changed with variations in flow velocity, so that the accuracy of consistency measurement was relatively poor in applications where the flow rate varied significantly. Prior instruments also suffered other defects; for example, in some instruments the suspended particles (e.g., paper fibers) tended to accumulate on parts inserted into the flowing stream so as to interfere with the operation of the instrument.

Accordingly, it is an object of this invention to provide improved apparatus for measuring the consistency of solid-liquid mixtures. A more specific object of this invention is to provide such apparatus wherein the consistency measurement is not importantly affected by changes in the flow rate of the mixture. Other objects, aspects and advantages of the invention will in part be pointed out in, and in part apparent from, the following description considered together with the accompanying drawings in which:

FIGURE 1 is a cutaway perspective view showing an instrument in accordance with this invention;
FIGURE 2 is a cross-section taken along line 2—2 of FIGURE 1;
FIGURE 3 is a longitudinal section taken along line 3—3 of FIGURE 2, particularly showing the configuration of the blade inserted in the flowing liquid;
FIGURE 4 is a horizontal section taken along line 4—4 of FIGURE 3, looking up towards the bottom of the blade;
FIGURE 5 is a side view of the rear end portion of a modified blade construction;
FIGURE 6 is an end view of the modified blade of FIGURE 5; and
FIGURE 7 shows an arrangement for reducing the impact forces on the front end of the blade.

Referring now to FIGURE 1, there is shown a flow pipe 10 adapted to carry a solid-liquid mixture such as paper stock. Secured to the top of this pipe is a consistency transmitter 12 comprising a blade 14 the length of which (measured along the pipe) is substantially greater than its thickness, thus presenting a small frontal area to the flow but comparatively large side areas. Referring also to FIGURES 2 through 4, this blade has a curved neck portion 16 which is rigidly attached at its front end to a vertical bar 18. This bar, in turn, is mounted by conventional means including a sealing diaphragm 20 for slight pivotal movement about a transverse axis 21 through the diaphragm.

Within the instrument casing 22 are force-balance means responsive to the torque applied by blade 14 to bar 18 about the transverse axis 21 and operable to produce a pneumatic output signal (for example, ranging from 3 to 15 p.s.i.) corresponding to the amount of the torque. Such torque-responsive means are known to the art, and thus will not be further described herein. For detailed information regarding similar apparatus of that type, reference may be made to U.S. Patent 2,806,480, issued to H. L. Bowditch.

In general, the blade 14 is subjected to two types of forces resulting from the material flowing through pipe 10. Specifically, what might be termed "edge" forces F1 are directed against the leading edge 24 of the blade due to the head-on impact of the flowing mixture, while what might be termed "side" forces F2 are applied to the broad flat side surfaces 26 of the blade due to the friction drag created by the flowing mixture. The edge forces increase with increases in the velocity of the mixture. The side forces, however, apparently are influenced by the non-Newtonial character of the mixture, with the result that the variation of these forces with velocity depends upon various characteristics such as the nature of the solid material in the suspension, the absolute velocity of flow, etc. The side forces will increase with velocity in many situations, although a zero or negative slope is possible under some circumstances. In any event, the side forces increase with increases in consistency of the mixture.

The blade 14 is formed with narrow tail 28, the leading edge of which extends at an angle with respect to the direction of flow. The resulting deflection of the flowing mixture produces an impact force F3 which creates a moment about the pivot axis 21 of the blade opposing the moment developed by the other forces F1 and F2. This impact force increases with increasing velocity of the flow mixture. The shape and size of the tail are specifically selected to produce a negative moment substantially counterbalancing the positive moment developed by the impact forces F1 on the leading edge 24 combined with the velocity-responsive component of the side forces F2. Thus with these balanced moments all varying together with changes in flow velocity, the net moment produced by the blade at axis 21 will be affected only negligibly by changes in flow velocity while still being sensitive to changes in consistency.

In effect, the moment produced by the force F3 acting on the tail 28 tends to compensate for changes in the impact force F1 on the leading edge 24, as well as for changes in the drag force F2 due to variations in flow rate. Since these latter changes depend to some extent upon the character of the solid-liquid mixture involved, the compensation fatcor may be tailored to the specific conditions to be encountered. In many instances, however, a single general-purpose blade and tail shape will prove satisfactory for various operating conditions.

Advantageously, the leading edge 24 of the blade 14 is blunt, e.g., square-edged with sharp corners and a flat impact face. Although the action of the paper stock fibers at this leading edge may not be fully established as a technical matter, it is thought that the fibers receive little or no tangential velocity upon striking the leading edge, while the water does. Thus there would be a tendency to "de-water" the fibers at the leading edge, with the result that liquid relatively rich in fibers would move along in contact with the broad sides of the blade, separated from the main stream by a so-called "water barrier," that is, a segment of the flow stream relatively low in fiber content. The distance which the fiber-rich liquid travels along the sides 26 presumably would vary with flow velocity, with a resulting variation in drag force, and this variation could be negative if the distance travelled along the sides decreased with increases in flow rate. Thus this factor can produce a self-compensating variation in net torque about axis 21.

The smooth curvature of the leading edge 24, as seen in FIGURE 2, produces a self-cleaning action which tends to prevent any accumulation of fibers to interfere with the operation of the instrument.

Some cavitation or turbulence will be produced at the trailing edge of the blade 14 beneath the tail 28. To some extent, this effect may be desirable to alter the net torque about the pivot axis 21. It may, however, be advantageous in certain circumstances to reduce the turbulence by forming the trailing edge with a tapered or pointed configuration as best seen in FIGURE 4.

In a commercial instrument constructed and tested the blade 14 had a length of nearly 8 inches, measured axially of the pipe 10, and a thickness of about 0.25 inches. Thus the blade had a length-to-thickness ratio of about 30. Under some circumstances, a lower length-to-thickness ratio will be satisfactory, but it is considered that the length always should be substantially greater than the thickness, i.e., at least several times the thickness, in order to assure that the side drag forces will be sufficiently large to provide the desired sensitivity to changes in consistency.

FIGURES 5 and 6 show a modified blade 14a wherein a downwardly directed compensating force is produced by inclined vanes 30 mounted on both sides of the blade. FIGURE 7 shows the provision of a stationary member 32 secured to the top of the pipe wall and extending down a short distance in front of the blade 14b to serve as a dummy front edge so as to reduce the impact force on the actual leading edge of the blade. This dummy may have a thickness approximately equal to that of the blade so as not to interfere significantly with the flow of the mixture along the sides of the blade. By reducing the impact force on the leading edge, there is a corresponding reduction of the required compensating force to produce a counter-balancing moment about pivot axis 21b.

Although embodiments of the invention have been disclosed and described herein in detail, it is desired to stress that this is for the purpose of illustrating the invention so that it can be adapted and modified as required to meet specific applications, it being understood that the scope of the invention is not limited to such details. For instance, the blade referred to above may be replaced by a number of similar blades arranged to operate in parallel to produce the same effect as a single blade of larger area. Moreover, the force-balance means in the casing 22 may, alternatively, be electric or hydraulic.

In this specification the term "impact force" on the blade means the force due to the sudden rearrangement of fibres at the leading edge presented to the flowing mixture.

I claim:

1. Apparatus for measuring the consistency of a flowing solid-liquid mixture, said apparatus including a blade member positioned within said flowing mixture with its broad sides generally parallel to the direction of flow, support means mounting said blade member for rotational movement about a pivot axis transverse to said direction of flow, said pivot axis being offset laterally with respect to said blade member so that the forces resulting from impact of said mixture on the blade leading edge and from drag along the broad sides thereof develop corresponding moments about said pivot axis; a device coupled to said blade support and including means responsive to the moment applied thereto by said blade member for producing an output signal corresponding to said applied moment; and compensating means in the stream of said flow mixture reducing the velocity-responsive component of said moment and minimizing the effect of said impact forces relative to said drag forces, thereby reducing the sensitivity of said output signal to changes in the flow rate of the mixture.

2. Apparatus as claimed in claim 1, wherein the length of said blade member is substantially greater than its thickness.

3. Apparatus as claimed in claim 1, wherein said blade member is held at its front end by said support means.

4. Apparatus as claimed in claim 3, wherein the leading edge of said blade member is curved gradually towards the rear of the blade, to provide a self-cleaning action.

5. Apparatus as claimed in claim 1, wherein the leading edge of said blade member is square-edged to present a blunt surface having a lateral dimension corresponding to the thickness of the blade.

6. Apparatus as claimed in claim 1, wherein said compensating means comprises an element secured to said blade near the rear end thereof and disposed at an angle with respect to said direction of flow so as to deflect part of the stream and produce a counter-balancing moment about said pivot axis in opposition to the moment produced by said impact forces.

7. Apparatus as claimed in claim 6, wherein said element comprises an elongated tail extending to the rear of said blade member and in the plane thereof.

8. Apparatus as claimed in claim 7, wherein said blade member is mounted in a flow pipe carrying said solid-liquid mixture, said support means being secured to the upper surface of the pipe wall and connected to the main body of the blade by a neck portion gradually curving downwardly and to the rear to join with said main body, said tail element extending up and to the rear away from said main body.

9. Apparatus as claimed in claim 6, wherein said element comprises a deflector vane on at least one side of said blade.

10. Apparatus as claimed in claim 1, wherein the thickness of said blade member is at least approximately uniform throughout its length so that said broad sides are effectively flat and parallel.

11. Apparatus for measuring the consistency of a flowing solid-liquid mixture comprising a blade member of at least approximately uniform thickness so that the broad sides thereof are effectively flat and parallel; means mounting said blade member in said flowing mixture with said broad sides parallel to the direction of flow, the length of said blade member in the direction of flow being substantially greater than the thickness thereof; sensing means for detecting the forces applied to said blade member by the flowing mixture and adapted to produce an output signal responsive thereto; and compensating means in said flowing mixture to produce an effect responsive to the rate of flow of said mixture, said compensating means being coupled to said sensing means to tend to minimize changes in said output signal due to changes in the total forces on said blade resulting from changes in the rate of flow of said mixture.

12. Apparatus as claimed in claim 11, wherein the length of said blade member in the direction of flow is greater than its height.

13. Apparatus as claimed in claim 11, wherein the leading surface of said blade member is square-edged so as to present a blunt impact surface to the flowing mixture.

14. Apparatus as claimed in claim 11, including a fixed member secured in front of the leading edge of said blade to deflect at least a portion of the impact of the flowing mixture from said edge.

15. Apparatus for measuring the consistency of a flowing solid-liquid mixture, said apparatus comprising a blade member of at least approximately uniform thickness so that the broad sides of said blade member are effectively flat and parallel; means mounting said blade member in said flowing mixture with the broad sides thereof parallel to the direction of flow; said mounting means comprising a pivot means at the front end of said blade member and offset laterally therefrom so that said forces developed by the flowing mixture produce a moment about the pivot axis; sensing means responsive to the forces applied to to said blade member by the mixture flowing past, said sensing means including a force-balance device producing an output signal corresponding to the magnitude of the net moment at said pivot axis; said blade member including near the rear end thereof an element disposed at an angle with respect to said direction of flow and arranged to deflect a portion of the flowing mixture to produce a moment about said pivot axis opposing the moment developed by said forces, said element having a thickness at least approximately equal to the thickness of said blade member and having a relatively small side area, so as to develop predominately edge impact forces; the length of said member in the direction of flow being substantially greater than the thickness thereof so that the drag forces induced by the sliding of the mixture past and in contact with said broad sides predominate over the impact forces developed by the striking of said mixture against the exposed frontal surfaces of said blade member.

16. Apparatus for measuring the consistency of a flowing stream of solid-liquid material comprising an element extending into the stream and including means subject to the movement of the stream for developing both impact forces and drag forces; a support mounting said element for pivotal movement, said support being so arranged that said forces produce a moment about the pivot axis thereof; sensing means producing an output signal responsive to the torque developed by said element about said pivot axis; and compensating means integral with said element and in said flowing stream, said compensating means being responsive to flow velocity for producing a counterbalancing moment about said pivot axis in opposition to the moment resulting from said forces, said counterbalancing moment reducing the flow-sensitive component of torque developed by said element whereby said output signal is not affected significantly by changes in flow rate.

17. Apparatus as claimed in claim 16, wherein the pivot axis of said support is adjacent one boundary of the channel through which said material is flowing.

18. Apparatus as claimed in claim 17, wherein said compensating means comprises a member integral with said element and arranged to deflect a portion of said stream in a direction towards said boundary, thereby to apply to said element a force in the opposite direction and develop a negative moment about said pivot axis.

References Cited

UNITED STATES PATENTS

| | | | |
|---|---|---|---|
| 1,125,017 | 1/1915 | Green | 73—59 |
| 2,354,299 | 7/1944 | Bays | 73—59 |
| 3,068,690 | 12/1962 | O'Dair et al. | 73—147 |
| 3,098,384 | 7/1963 | Nusbaum | 73—228 |

DAVID SCHONBERG, *Primary Examiner.*